US005590684A

United States Patent [19]
Alberts et al.

[11] Patent Number: 5,590,684
[45] Date of Patent: Jan. 7, 1997

[54] DUAL PILOT MANIFOLD ASSEMBLY FOR A SAFETY RELIEF VALVE

[75] Inventors: Jack B. Alberts, Houston; Michael D. McNeely, Katy, both of Tex.

[73] Assignee: Keystone International Holdings Corporation, Houston, Tex.

[21] Appl. No.: 523,051

[22] Filed: Sep. 1, 1995

[51] Int. Cl.$^6$ .................................................. F16K 17/10
[52] U.S. Cl. ...................... 137/489; 137/492; 137/637.1
[58] Field of Search .................................. 137/492, 489, 137/637.1

[56] References Cited

U.S. PATENT DOCUMENTS

| | | | |
|---|---|---|---|
| 2,731,032 | 1/1956 | Hughes | 137/492 |
| 2,884,008 | 4/1959 | Elsdon | 137/637.1 |
| 3,512,560 | 5/1970 | Weise | 137/102 |
| 3,664,362 | 5/1972 | Weise . | |
| 4,172,466 | 10/1979 | Pattarini et al. | 137/488 |
| 4,402,341 | 9/1983 | Reip | 137/492 X |
| 4,429,711 | 2/1984 | Schomer | 137/637.1 X |
| 4,527,770 | 7/1985 | Vanderburg | 137/492 X |
| 4,615,356 | 10/1986 | Reip | 137/492 X |
| 4,669,493 | 6/1987 | Kober et al. | 137/489 X |
| 4,672,995 | 6/1987 | Powell | 137/489 |
| 4,821,772 | 4/1989 | Anderson, Jr. et al. | 137/625.46 |
| 4,848,397 | 7/1989 | Bickford et al. | 137/489 |
| 4,865,074 | 9/1989 | Bickford et al. | 137/489 |
| 4,870,989 | 10/1989 | Bickford et al. | 137/489 |
| 5,011,116 | 4/1991 | Alberts et al. | 137/488 |

OTHER PUBLICATIONS

Anderson, Greenwood & Co., Safety Valve Catalog, Mar. 1994, 26 pgs.
Anderson, Greenwood & Co., Technology for . . . Safety, Environmental Protection, and Productivity Improvement™, Jun. 1993, Bulletin 2–SSSV, 8 pgs.
Advertisement, Crosby JPV–A Valve, 1 pg., no date.
Snap–tite Advertisement, 1 pg., no date.
Snap–tite Catalog, Relief Valves, 4 pgs., no date.
Snap–title Catalog, Pressure Control Valves, 6 pgs., no date.
Snap–tite Catalog, Check Valves, 4 pgs., no date.

*Primary Examiner*—Stephen M. Hepperle
*Attorney, Agent, or Firm*—Browning Bushman

[57] ABSTRACT

A manifold assembly 10 for operating a safety relief valve 12 includes a manifold block 60 having a block inlet port 230, a block dome pressure port 232, and a pair of control cavities 220 and 222 each adapted for receiving a pilot valve 70 or auxiliary control member 80. Inlet control valves 74, 84, dome pressure control valves 76, 86, and test control valves 78, 88 are each mounted on the manifold block. One of the pilot valves may be maintained on-line for controlling operation of the safety relief valve, while the other pilot valve may be isolated for service. A cartridge pilot valve assembly 70 includes a bushing 126 for facilitating installation and removal of the cartridge valve assembly from the valve block. An improved metal washer 122 is provided having inner and outer knife edges 330, 334 for sealing engagement between the valve body 110 and the block 60.

27 Claims, 4 Drawing Sheets

DUAL PILOT MANIFOLD ASSEMBLY FOR A SAFETY RELIEF VALVE

FIELD OF THE INVENTION

The present invention relates to a manifold assembly for actuating a safety relief valve. More particularly, a non-flowing dual pilot manifold assembly is provided for activating a safety relief valve in fluid communication with a pressure vessel.

BACKGROUND OF THE INVENTION

Safety relief valves are commonly used to regulate the pressure in vessels. In a typical installation, a main safety relief valve is mounted on a tank or other pressure vessel for relieving fluid from the vessel if fluid pressure rises above a predetermined maximum safe value. A suitable safety relief valve includes a valve member reciprocal within a valve body. The valve member is normally in a closed position, and moves to an open position to relieve pressure in the vessel. A dome chamber provided in the relief valve is normally at the same pressure as the inlet pressure to the relief valve, and pressure in the dome chamber acts on the valve member to maintain the relief valve closed. A decrease in dome pressure causes the inlet pressure to open the relief valve and relieve pressure from the vessel. U.S. Pat. No. 4,870,989 discloses a safety relief valve, and an improved seal for safety relief valve is disclosed in U.S. Pat. No. 5,011,116. A suitable safety relief valve according to this invention is manufactured by Anderson Greenwood & Co. as a Type 727.

Pilot valves have been used to control the operation of the main safety relief valve, and are preferred over conventional spring valves for many applications. Early versions of pilot valves for controlling a main pressure relief valve are disclosed in U.S. Pat. Nos. 3,512,560 and 3,864,362. U.S. Pat. No. 4,172,466 discloses a pressure responsive valve with a tandem pilot and stabilizing valve assembly mounted on a safety relief valve. U.S. Pat. No. 4,672,995 discloses redundant pilot valves and a control system which allows each pilot valve to be independently actuated for triggering the safety relief valve to open and release excess pressure. The redundant pilot valves are mounted on a manifold body which in turn is supported on the housing of the main relief valve.

In many operations, a block valve cannot be used between the pressurized vessel and either the safety relief valve or the pilot valve, since the inadvertent closure of the block valve would obviate the entire safety control system. A valve selector manifold which allows one safety relief valve and its associated pilot valve to remain in service while a second relief valve and its associated pilot are removed from service is disclosed in U.S. Pat. No. 4,821,772. The solution proposed by the '772 patent allows for service while desirably reducing the number of openings to the pressure vessel, although this solution is relatively expensive since two separate relief valves are utilized.

One of the problems which has long plagued the use of pilot valves to control a main safety relief valve involves the pilot valve maintenance. The pressure in the vessel is frequently maintained near its maximum allowable value, so that pressure to the pilot valve is only slightly less than that required to trigger operation of the main relief valve. Accordingly, the valve element in the pilot valve is not held tightly into engagement with the seat, and instead may "flutter" against the seat without opening sufficiently to activate the relief valve. This causes high wear on the pilot valve, and also allows debris in the flow line to the pilot valve to prevent reliable seating between the pilot valve element and the seat. Accordingly, two pilot valves and a three-way control valve have been hydraulically interconnected by suitable flow lines, so that one pilot valve may be taken out of service during a maintenance operation while the other pilot valve reliably controls the operation of the relief valve. This technique allows for servicing of each pilot valve without shutting down the system protected by the main relief valve.

A prior art safety relief system employed by Anderson Greenwood comprises a pair of pilot valves connected hydraulically in parallel. Pairs of hand valves are connected to a manifold block, and each of the inlet control valves is spaced upstream from the respective pilot valve. A slidable link is movable with respect to the manifold block, and may be positioned so that one pair of hand valves remain open (and are prevented from closing by a mechanical stop) in order to supply vessel pressure to one of the pilot valves and then to the dome chamber of the relief valve. When the link is positioned so that the stop is removed to allow one pair of hand valves to close, the other pair of hand valves was inherently prevented from closing. This feature thus ensured that the vessel pressure would always be supplied to one of the pilot valves while the other pilot valve could be isolated from the system and removed during a pilot valve service operation. A test valve separate from the pair of hand valves allowed for testing of each pilot valve.

While the above solution is considerably less expensive than that provided by the '772 patent, the cost of the hand valves and the separate pilot valves, the mechanism for mounting the pilot valves, the separate test valves, the fittings required to fluidly connect these valves, and the time and expertise required to properly install the tubing which interconnects these valves are a considerable expense to the overall safety relief system. While these costs are justified for many applications in order to obtain the benefits of a pilot operated safety relief system, a standard spring biased relief valve system is used in many applications to reduce costs. Also, many of the flow lines which interconnect the various valves in the pilot operated safety relief system are continually supplied with high vessel pressure. Numerous threaded connections between these flow lines and the valves increase the likelihood of leakage and the resultant release of fluid to be protected by the safety relief system. If a leak developed in a flow line upstream from the shutoff valve to the pilot valve, it may be impossible to maintain the vessel pressure while repairing the leak. In some cases, a flow line leak may result in the premature or faulty operation of the relief valve. Also, the flow lines and the various valves in the pilot operated safety relief system are exposed and thus could be inadvertently ruptured, thereby again requiring a shutdown of the system which pressurized the vessel.

A related problem concerns the time and expense required to replace or repair a pilot valve in a safety system as described above. While one of the pilot valves remained in service and pressure was cutoff to the other pilot valve, the other pilot valve member could be removed from the system, but the pilot valve body itself typically had to be removed from both the upstream and downstream flow lines in order to properly readjust the blowdown pressure and replace the valve seat. The numerous components of the pilot valve complicate the pilot valve maintenance operation, and extends the off-line pilot valve replacement time. The longer operator time required to replace safety system components, the greater the likelihood of inadvertently damaging or rupturing a flow line and the longer an operator may be exposed to a potentially hazardous environment. Accordingly, these problems have limited the acceptance of pilot controlled relief valves in a safety relief system.

The disadvantages of the prior art are overcome by the present invention, and an improved dual pilot manifold assembly for activating a safety relief valve is hereinafter disclosed. The dual pilot manifold assembly of the present invention has a relatively low manufacturing cost, may be easily installed using preassembled components standard to a particular type of relief valve, substantially reduces the likelihood of vessel pressure leaking from the safety system, and reduces the operator time and expertise required to replace a worn pilot valve in the safety relief system.

SUMMARY OF THE INVENTION

A manifold assembly is provided for controlling the operation of a safety relief valve. The unitary manifold block includes a block inlet port in fluid communication with the pressure source controlled by the safety relief valve. More particularly, a fluid passageway provided in an end plate of the safety relief valve provides communication between the relief valve inlet port and the block inlet port. The manifold block also includes a block dome pressure port which is in fluid communication with a dome chamber in the safety relief valve via another passageway in the end plate. Actuation of the manifold assembly causes the relief valve member to move in response to inlet fluid pressure to open the relief valve when pressure rises above a set pressure value.

The manifold block includes first and second control cavities each having an inlet port and a dome pressure port. First and second inlet passageways in the manifold block fluidly connect the block inlet port with the first and second control cavity inlet ports, and first and second dome pressure passageways in the manifold block similarly connect the block dome pressure port with the dome pressure port in each control cavity. Corresponding inlet control valves mounted on the manifold block are provided for selectively closing the inlet passageway to each control cavity. Corresponding dome pressure control valves also mounted on the manifold block selectively close off the first dome pressure passageway and the second dome pressure passageway. The manifold block further includes first and second test passageways for fluidly connecting each control cavity with a respective test port, and first and second test control valves mounted on the manifold block selectively close off each test passageway. First and second vent passageways are provided in the manifold block for venting pressure from the respective first and second control cavities. Flow passageways in the manifold block are arranged to minimize the plugging of ports in the manifold block. The absence of external tubing lines substantially reduces the likelihood of leakage, and thus ensures reliable operation of the safety relief system.

At least one of the control cavities is provided with a pilot valve which is responsive to pressure in the block inlet port. The pilot valve is normally closed for maintaining fluid communication between the respective control cavity inlet port and the dome pressure port for supplying vessel pressure to the dome chamber in the relief valve. In a nonflashing liquid application, the pilot valve opens to establish fluid communication between the relief valve dome pressure chamber and the respective vent passageway in the manifold block to relieve gas from the dome chamber and open the safety relief valve. The second control port is provided with an auxiliary control member, which may be a second pilot valve, a pressure gauge, a fluid temperature sensing gauge, a solenoid valve, or other fluid measurement or control device. When the manifold assembly is regulating a flashing liquid, such as steam, an unloader valve may be provided within the manifold block. The unloader valve is normally closed for prohibiting fluid communication between a dome chamber line extending to the relief valve outlet port and the dome chamber in the relief valve. The unloader valve opens when the respective pilot valve opens and releases pressure in an unloader valve chamber to the vent passageway of the pilot valve. The unloader valve releases pressure from the dome chamber to the relief valve outlet port.

A selector mechanism is provided positionable with respect to the manifold block for mechanically preventing closing of one of the inlet control valves and the corresponding dome pressure control valve while in one position, and for preventing closing of the opposing valves while in a second position. The selector mechanism thus mechanically prevents closure of the valves to ensure that at least one of the pilot valves is continually on-line for regulating the relief valve.

Each of the pilot valve assemblies is preferably a cartridge assembly, wherein the components involved in adjusting and controlling the valve set pressure and the components involved in adjusting and setting the blowdown pressure are included with the pilot valve element to form a unitary cartridge assembly. Each cartridge valve assembly may thus be easily removed from the manifold block and replaced with a new or repaired cartridge valve. A bushing engages the valve body and has external threads for threaded engagement with the block. The bushing allows seals between the valve body and the manifold block to be axially raised and lowered with respect to the manifold block during the removal and replacement operation without rotating the valve body or these seals. A metal washer may be also provided for sealing engagement between the valve body and the block, with the metal washer having an upper knife edge and a lower knife edge for sealing engagement with the outer cylindrical surface of the valve body and an inner cylindrical surface of the block, respectively. The metal washer seal provides reliable fluid-tight engagement between the valve body and the block by applying a relatively small amount of torque to the bushing.

It is an object of the present invention to provide an improved manifold assembly for controlling a relief valve, wherein external tubing lines which are normally exposed to high pressure are substantially if not completely eliminated. A related object of the invention is to improve the reliability of a safety relief system by minimizing the likelihood of leakage between the valves of the assembly which control the operation of the safety relief system.

Another object of the invention is to provide an improved cartridge valve assembly for mounting to a block cavity, wherein the cartridge valve assembly includes both a valve set pressure mechanism and a valve blowdown pressure mechanism. The cartridge valve assembly of the present invention substantially reduces the time and expertise required to properly install a pilot valve in a manifold assembly.

It is a feature of the present invention that the manifold assembly is constructed to provide a compact design wherein the control valves are easily accessible, yet relatively few drilled passageways are provided in the manifold block. It is a further feature of the invention that the manifold assembly may include an unloader for increasing the speed of operating the safety valve when used in flashing liquid applications. It is also a feature of the manifold assembly that the various passageways and ports in the manifold block are arranged to provide gravity draining of condensate, which also assists in removing debris from the passageways within the manifold block.

An advantage of this invention is that the cartridge valve assembly may be reliably installed in a manifold block using a relatively low torque. The manifold assembly of the present invention may be installed on existing safety valves, such that rework or modification of the safety valves is not required.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
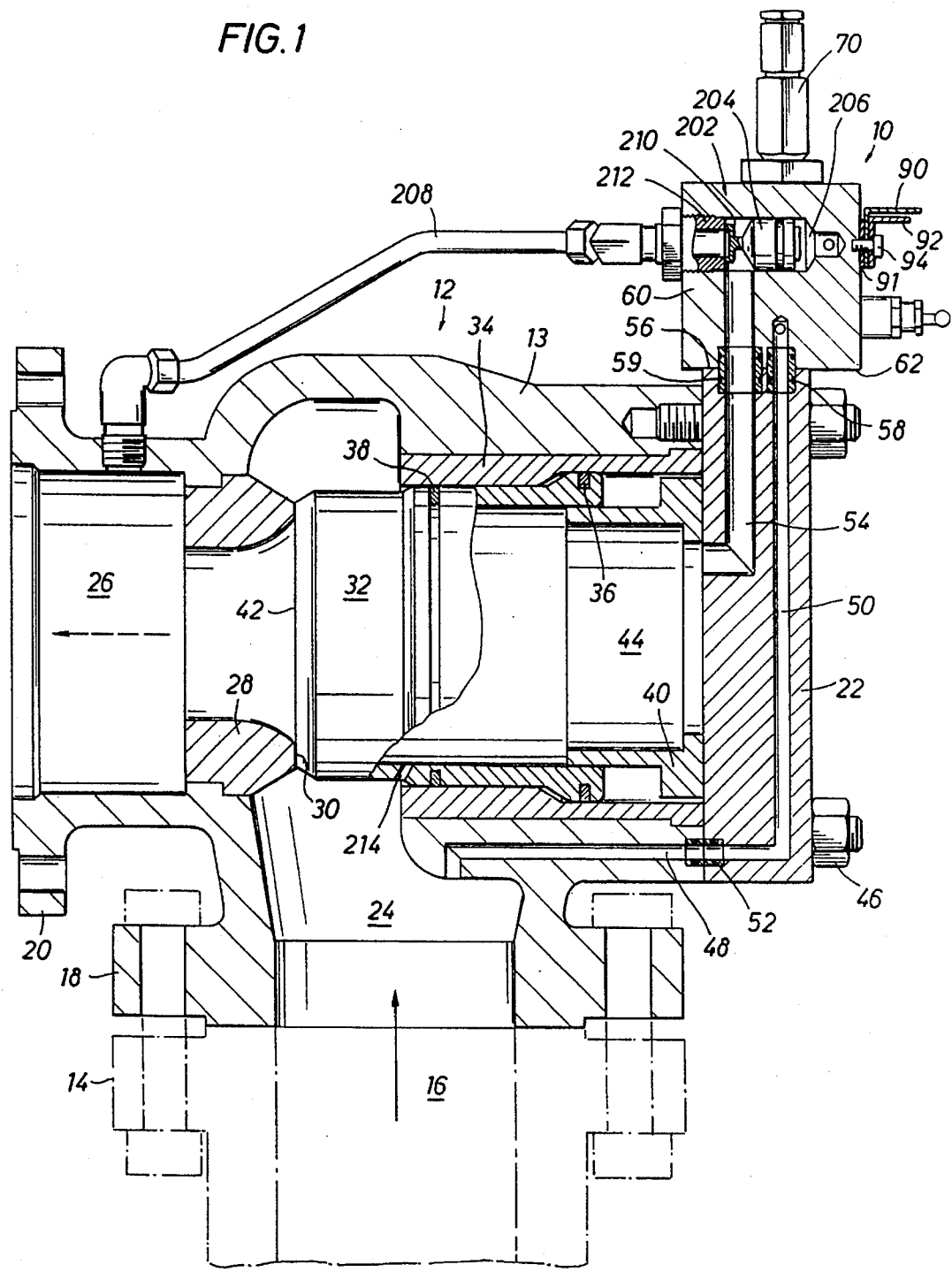
FIG. 1 is a cross-sectional side view of a pilot-operated pressure relief valve according to the present invention for relieving pressure from a vessel having a vessel flange depicted in dashed lines. The manifold assembly of the invention for controlling actuation of the safety relief valve is illustrated in the upper right hand corner of FIG. 1.

FIG. 1 illustrates a suitable manifold assembly 10 mounted on a safety relief valve 12. As discussed hereafter, the manifold assembly 10 controls the operation of the safety relief valve 12 to prevent excessive build up of fluid pressure within a pressurized tank, flow line, or other fluid containing vessel. Accordingly, valve 12 is normally closed, but opens to automatically relieve excess pressure in the fluid system. While the valve 12 may be used for various applications, it will be discussed hereafter in an exemplary installation wherein the valve 12 is mounted on a flange 14 of a vessel containing high pressure steam. A particular feature of the present invention is that the manifold assembly is able to withstand temperatures in excess of 500° F., so that the manifold assembly may be reliably used to control pressures in fluid systems housing steam and other high temperature gasses. Port 16 in the vessel flange 14 is thus exposed to pressurized steam in the vessel. If the steam pressure rises above an acceptable predetermined level, the manifold assembly 10 automatically opens the safety relief valve 12 to release excess pressure from the vessel and prevent a possible catastrophic explosion.

The manifold assembly 10 may be used for controlling various types of safety valves. An exemplary safety valve 12 depicted in FIG. 1 includes a housing 13 having a lower inlet flange 18, an outlet flange 20, and an end cap or cover 22. The inlet port 24 is continually exposed to steam pressure in the vessel, while the outlet port 26 is connected to a conventional vent line or other system for venting high pressure gas. Suitable seals (not shown) ensure reliable sealing engagement of the safety valve housing 13 with the upstream vessel and the downstream vent system. The pressure relief system as shown in FIG. 1 is particularly well suited for use in fluid systems handling high temperature fluids in excess of 350° F., and may be utilized in systems containing steam, air, or other fluids maintained at a temperature of from 500° F. to 1000° F.

Metal annular seat ring 28 is fixed within the housing 13, and includes a planar seating surface 30 thereon. Piston valve member 32 is reciprocal within the housing 13 for engagement and disengagement with sealing surface 30. Sleeve 34 defines a bore for slidably receiving the valve member, and a split ring 38 and seal ring 36 ensure reliable sealing engagement between the sleeve 34 and the reciprocating valve element 32. The valve element 32 as shown in FIG. 1 is normally in a closed position, and may move to the right to pass steam from the inlet 24 to the outlet 26. The left end of the valve element 32 adjacent sealing surface 42 is solid in cross-section, so that fluid cannot pass from the dome chamber 44 in the housing to the outlet port 26. The valve element 32 may be provided with a flexing disk seat and a cushioning sleeve 40 as discussed in U.S. Pat. No. 4,865,074, which also discloses additional features of a suitable safety relief valve.

The end plate 22 is connected to housing 13 by threaded fasteners 46, thereby allowing removal of the end plate 22 during periodic relief valve service operations to facilitate repair or replacement of the seals and other internal components within the relief valve. An inlet passageway 48 in the housing 13 and a mating passageway 50 in the end plate 22 provide continual fluid communication between the inlet port 24 and the manifold assembly 10. A conventional sealing member 52 ensures reliable sealing between the housing 13 and the end plate 22. Another passageway 54 in the end plate 22 maintains fluid communication between the dome chamber 44 in the housing 13 and the manifold assembly 10. Lower planar face 62 of the metal block 60 is thus mounted directly on the upper planar face 56 of the end cap 22 (see FIG. 2). A pair of sealing members 58 and 59 may be used for reliable sealing between the manifold block 60 and the end plate 22.

Figure 2:
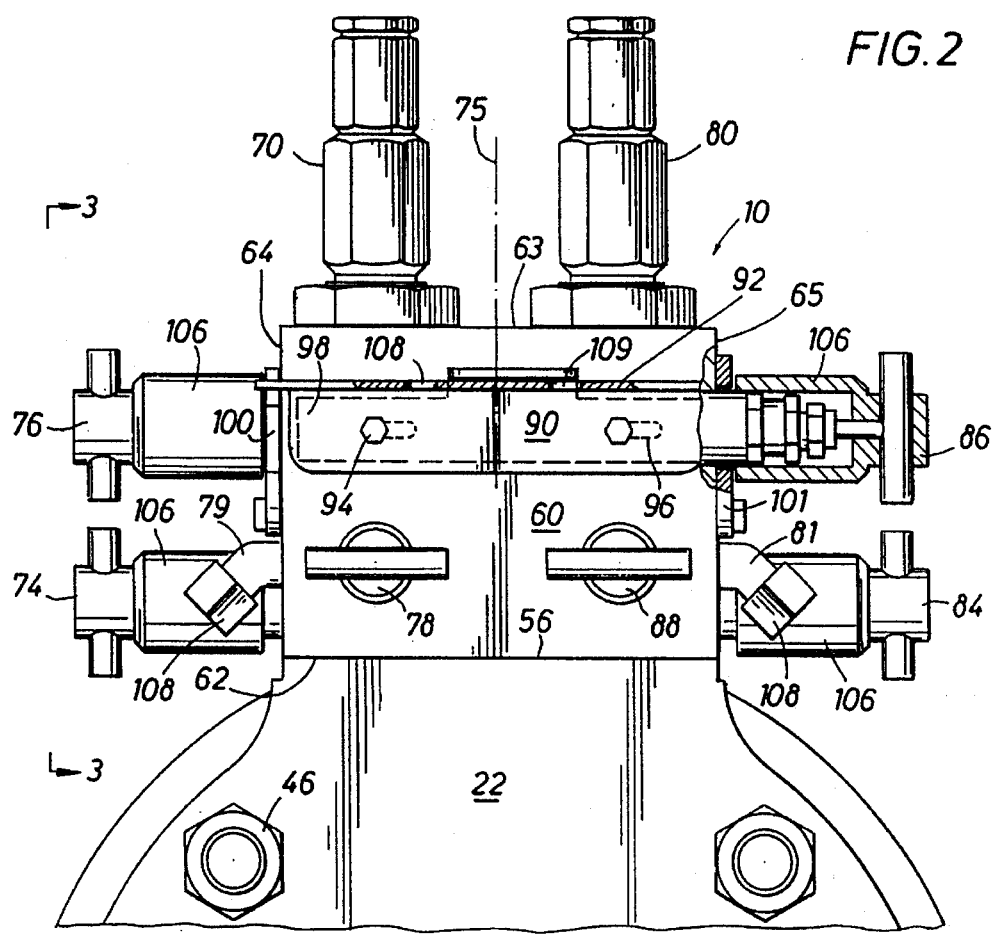
FIG. 2 is a front view of the manifold assembly and a portion of the relief valve shown in FIG. 1.
Figure 3:
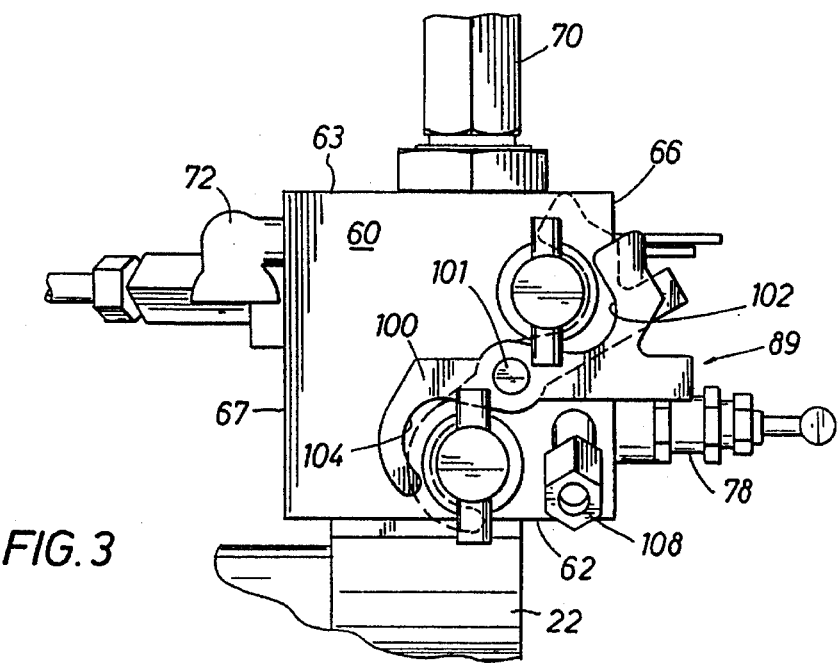
FIG. 3 is a side view of the manifold assembly shown in FIG. 2, illustrating particularly the selector mechanism for preventing closure of the control valves.

The manifold assembly 10 as shown in FIGS. 1, 2 and 3 includes first and second pilot valves 70 and 80 each extending upward from an upper planar face 63 of the manifold block 60. A first inlet control valve 74, mounted directly to the manifold block and extending from a first side 64 of the block, may be manually operated by a handle to open and close off pressure from passageway 50 to the first pilot valve 70. The first dome pressure valve 76 is similarly mounted on the manifold block and controls pressure between the dome chamber 44 and the first pilot valve 70. A first test control valve 78 is mounted to the manifold block and extends through a planar front face 66 of block 60. Valve 78 controls fluid pressure between the first pilot valve and test line 79 extending from the first face 64 of the block 60. Manifold 10 is generally symmetrical about centerline 75 as shown in FIG. 2, and pressure to the second pilot valve 80 is similarly controlled by valves 84 and 86 each mounted to the manifold block and extending from the second side 65 of the block. A second test control valve 88 is mounted to the block and extends from the front face 66 to control fluid pressure between the test line 81 and the second pilot valve 80. FIG. 3 illustrates a vent cap 72 extending from the rear face 67 of the manifold block 60. Vent cap 72 is provided for venting fluid from the first pilot valve, and a similar vent cap (not shown) is provided for venting fluid from the second pilot valve 80.

FIGS. 1, 2 and 3 also illustrate a selector mechanism 89 which is positionable for preventing closure of the inlet control valve and the dome pressure control valve associated with one of the pair of pilot valves 70 and 80. Selector mechanism 89 includes a plate 90 slidably positioned between a pair of plates 91 and 92 (see FIG. 1) each fixed to the block 60 by bolts 94. The slidable plate 90 includes a pair of slots 96 which allow sliding movement of plate 90 with respect to the block 60 from a second, fight side position as shown in FIG. 2 to a first, left side position. When in the first, left side position, end 98 of plate 90 extends past the first face 64 of the block 60 to prevent rotation of swing plate 100. Plate 100 pivots about bolt 101 as shown in FIG. 3 from a stop position (as shown in dashed lines) to a release position (as shown in solid lines). When plate 90 is in the first, left side position, swing plate 100 must be in the stop position, and is prevented from rotating to the release position by mechanical engagement with end 98. When in the stop position, the U-shaped cutouts 102 and 104 in the swing plate 100 are positioned between the block 60 and the respective caps 106 of valves 76 and 74, respectively, thereby mechanically preventing closure of these valves. Only when the opposing swing plate 101 on the fight side of block 60 is moved to its stop position may the plate 90 be slid to its second, right side position, thereby ensuring that the second swing plate 101 prevents closure of the valves 86 and 84. Only when the plate 90 is moved to the second, right side position may the first swing plate 100 then be manually moved to its release position, as shown in solid lines in FIG. 3, thereby allowing closure of the valves 76 and 74. A pair of holes 108 and 109 may be provided in the plate 92 for receiving a padlock or other conventional locking member to prevent inadvertent movement of the plate 90 with respect to the block 60.

A preferred embodiment of the manifold assembly 10 includes an unloader valve discussed subsequently when the pilot valve is exposed to a flashing liquid, such as steam, which may condense within the main valve dome chamber. The manifold assembly need not include this unloader valve, however, when used to maintain non-flashing gasses at a safe pressure within the vessel. The operation of the selector mechanism 89 and the purpose served by the dual pilot valves may be understood without reference to the unloader valve. With the selector mechanism 89 positioned as shown in FIG. 2, valves 84 and 86 must be open, and pressure in the inlet port 24 of the safety relief valve 12 is thus supplied to the pilot valve 80. The pilot valve 80 may be set to open at, for example, 800 psi. As long as vessel pressure is less than 800 psi, pressure in the inlet port 24 of the relief valve is passed through the manifold assembly 10 and then to the dome chamber 44. The substantial force of the pressure in the chamber 44 acting on the piston-like valve element 32 thus maintains the safety relief valve closed. If vessel pressure arises above 800 psi, the pilot valve 80 is actuated to block flow from the passageway 50 to the passageway 54, and simultaneously to release the pressure in the dome cavity 44 to the vent line associated with pilot valve 80. Venting of the chamber 44 thus allows the valve element 32 to move right from the position shown in FIG. 1, thereby releasing pressure from the vessel. If vessel pressure drops below a blowdown pressure of, for example, 750 psi, the pilot valve 80 will again close to block flow between the dome chamber 44 and the vent line, and simultaneously establish fluid communication between the fluid lines 50 and 54 in the end cap, thereby again pressurizing the dome chamber 44 and returning the safety relief valve element 32 to its closed position.

It should be understood that, while the selector mechanism 89 is in this position and the pilot valve 80 is "on-line", the swing plate 100 will normally be moved to a release position, and the valves 74 and 76 will be closed. Accordingly, the first pilot valve 70 may be removed from the block 60 and serviced. Also, a pressure transducer or other pressure gauge, a temperature sensing transducer or other temperature sensing gauge, or a solenoid valve may be inserted into the manifold block at a position previously occupied by the first pilot valve. Any time an auxiliary control member other than a pilot valve is mounted on the manifold block, it is preferable that the selector mechanism 89 be locked out, as previously described, to prevent sliding movement of the selector mechanism. The manifold block of this invention accordingly allows a pressure gauge to be substituted for the pilot valve, and the valves 74 and 76 thereafter reopened. The second pilot valve 80 reliably controls operation of the safety relief valve 12, while the pressure to the safety relief valve may be simultaneously monitored by the pressure gauge. While the second pilot valve 80 remains on-line, the pressure gauge may be replaced with a temperature sensing gauge or solenoid valve. Those skilled in the art will appreciate that an electric, pneumatic, or hydraulically operated solenoid valve permits the desired actuation of the relief valve independent of the vessel pressure. It should be understood that with both first and second pilot valves mounted on the manifold assembly and the valves 74, 76, 84 and 86 open, the selector mechanism 89 may be moved to the first, left side position so that swing plate 100 prevents closing of valves 74 and 76. The swing plate 101 may then be moved to the release position, allowing the valves 84 and 86 to be closed. The pilot valve 80 may then be serviced, or as explained above, or replaced with a pressure gauge, sensing gauge, or solenoid valve. The dual pilot design for the manifold assembly allows a spare pilot to be available to replace an on-line pilot without interrupting safety protection. Accordingly, at least one active or on-line pilot is always available to safely control system pressure, even during pilot switch-over operations.

FIG. 1 depicts a suitable unloader valve 202 within the manifold block 60 of the manifold assembly 10. The passageway 54 in the end plate 22 is in fluid communication with the left side of unloader piston 204, while the unloader chamber 206 to the right of the unloader piston is normally pressurized by inlet fluid pressure from passageway 50 transmitted through one of the pair of pilot valves 70 and 80. Unloader line 208 fluidly interconnects the manifold assembly 10 with the outlet port 26 of the safety relief valve 12. During normal operations, passageway 54 is sealed from the unloader line 208 by unloader valve element 210 in sealed engagement with bushing seat 2 12. Inlet fluid pressure in the unloader chamber 206 thus maintains the unloader valve closed while the respective pilot valve is closed. Inlet fluid pressure is also supplied to the dome chamber 44 through the fluid passageway 214 in the safety valve element 32. The passageway 214 in piston valve member 32 ensures that inlet fluid pressure will act on the left side of the unloader piston 204 and on the pilot valve to allow venting of chamber 44 through the manifold assembly 10 and through the unloader line 208 to the outlet port 26 in the event the inlet fluid pressure in line 50 to the manifold assembly should become plugged.

Unloader 202 is thus triggered by actuation of the pilot valve 70 or 80, and in turn causes actuation of the safety relief valve 12. During operation of the safety relief valve 12, the unloader allows fluid in the chamber 44 to be vented to the downstream port 26 of the safety valve, and only the relatively small amount of fluid in the unloader chamber 206 is vented through the pilot valve. Those skilled in the art will appreciate that the pressure in the dome chamber 44 need only be maintained at approximately 40% of the inlet pressure 24 in order to maintain the safety relief valve closed. The use of an unloader 202 is particularly important when the relief valve 12 is provided in a steam system, since the speed of actuating the safety relief valve is substantially shortened by providing the unloader. Also, only a small amount of steam is vented from the chamber 206 of the unloader during opening of the safety relief valve, thereby desirably minimizing the venting of steam from the manifold assembly.

With the selector mechanism 89 positioned for supplying vessel pressure to one of the pilot valves, the relief valve pressure setting of the other pilot valve may be easily tested and adjusted without removing the pilot valve from the manifold body 60. The inlet control valve and the dome pressure control valve associated with the pilot valve to be pressure tested may be closed, thereby isolating that valve. The test control valve 78 or 88 associated with the valve to be tested may then be opened, and a pressurized gas source connected to the respective fitting 108. Nitrogen or another gas of a selected pressure may then be supplied to the pilot valve, and the pilot valve conventionally adjusted so that pilot valve opens so that the supplied gas is vented to the vent cap 72 at the desired pressure setting.

Another purpose of the test valve 78 and 88 is to ensure that the safety relief valve 12 may be opened at any time, regardless of the level of pressure in the inlet cavity 24. An operator may wish to temporarily open the safety relief valve 12 even though the pressure in the vessel is significantly less than the maximum allowable pressure. To open the relief valve 12, the respective test valve 78 or 88 associated with the on-line pilot valve may be opened, thereby releasing pressure from the dome chamber 44 and opening the relief valve. Once proper operation of the relief valve has been assured, the respective test valve 78 or 88 may be closed, thereby resuming normal operations of the safety relief system.

Figure 4:
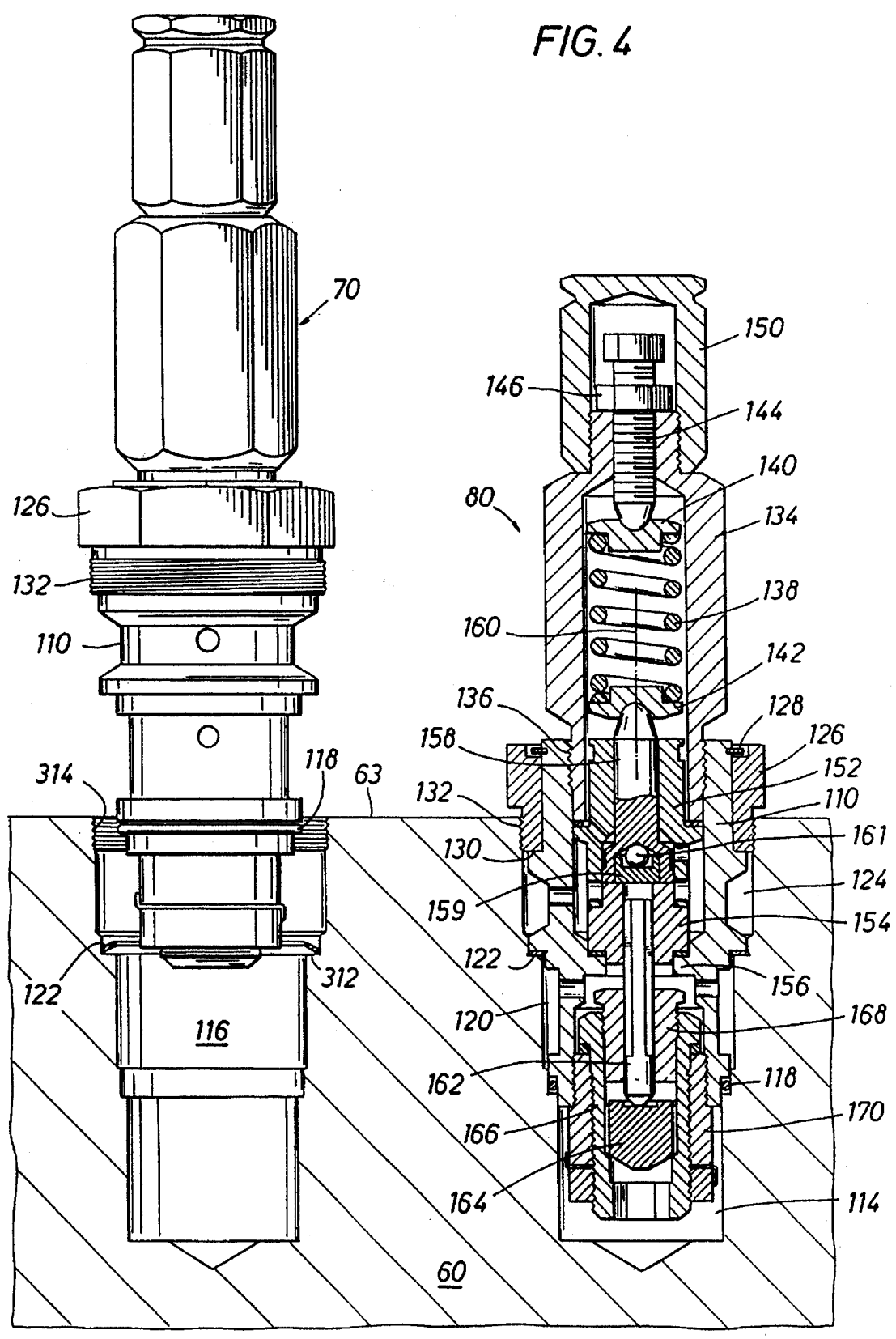
FIG. 4 illustrates a pair of pilot valve assemblies and a portion of a manifold block as shown in FIG. 2. A pictorial view of a cartridge valve assembly on the left side of FIG. 4 is depicted prior to insertion of the cartridge valve assembly in the manifold block, while the cartridge valve assembly illustrated in cross-section on the right side of FIG. 4 is shown in its installed position within the manifold block.

Referring to FIG. 4 and particularly pilot valve 80, each of the pilot valves used in the manifold assembly 10 may be cartridge valves suitable for high temperature operation. Each pilot valve may be a "no flow" valve so that no substantial amount of fluid flows through the valve during normal operation. A non-flowing pilot valve is substantially less effected by orifice sizes and is thus more responsive to pressure changes than a flowing pilot valve. Pilot valve 80 includes a valve body 110 having a central bore therethrough. Passageway 50 in the end plate 22 is in fluid communication with the lower portion of cavity 116 in the manifold block 60, thereby providing vessel pressure to the inlet chamber 114. A metal O-ring 118 is carried by the valve body 110, and provides an essentially fluid-tight seal between the valve body and the manifold block 60. A slight leakage around seal 118 does not adversely effect the operation at the pilot valve. Annular chamber 120 between the valve body 110 and the block 60 is in fluid communication with the passageway 54 in the end cap 22. Wedge seal ring 122 provides sealing engagement between valve body 110 and block 60; it is important that the seal 122 remain fluid-tight to prevent leakage from cavity 120. Cavity 124 between the valve body 110 and the block 60 is provided above wedge seal ring 122, and is in fluid communication with the vent cap 72.

Bushing 126 is retained on the valve body 110 by snap ring 128. Bushing 126 includes a stop surface 130 for forced engagement with the body 110, and external threads 132 for threading engagement with mating threads on the block 60. Bushing 126 is important to the installation and removal of the cartridge valve assembly 80, as described subsequently.

Bonnet 134 is threaded to the valve body 110 at threads 136. Spring 138 is housed within the bonnet 134 between an upper spring follower 140 and a lower spring follower 142. An adjustment screw 144 acts on the upper spring follower 140 to adjust the compression of the spring in a manner conventional to pilot valves. A lock nut 146 prevents inadvertent rotation of the adjustment screw 144, and a cap 150 acts as a cover to protect the adjustment screw 144.

Guide 152 engages nozzle 154, and both the guide and the nozzle are retained in a fixed position by the bonnet 134 pressing downward on the guide and forcing the nozzle into sealing engagement with the support ledge 156 of the body 110. Guide 152 receives a spindle 158 which moves along pilot valve axis 160 with respect to the guide. The spindle 158 is biased downwardly by the spring 138, thereby forcing seal member 159 into sealing engagement with nozzle 154. Ball member 161 serves to maintain the seal member 159 concentric within the spindle 158 for reliable sealing engagement with the nozzle 154, and also ensures uniform seating of the nozzle 154 and the seal member 159. Nozzle 154 has a central port for receiving rod 162 therein while providing fluid communication between the chamber 114 and the seal member 159. Valve body extension 170 is threaded to sleeve 166, which guides axial movement of piston 164. The pilot valve as shown in FIG. 4 is in its normal closed position, so that the chamber 114 is in fluid communication with the chamber 120. Fluid flows around the piston 164 and between the rod 162 and blowdown seat 168 to pass inlet fluid pressure in chamber 114 through the pilot valve and to the unloader valve.

Upon an increase in vessel pressure above a predetermined set pressure required to compress the spring 138, the increased fluid pressure lifts the seal member 159 off the nozzle 154. This increased pressure also moves piston 164 upward toward blowdown seat 168, thereby forcing the rod 162 upward as the seal member 159 lifts off the nozzle 154. The lifting of seal member 159 establishes fluid communication between the chamber 120 and the chamber 124. When the piston 164 seals against the lower face of the blowdown seat 168, fluid communication between the chamber 114 and the chamber 120 is blocked. All the components of the relief valve set pressure mechanism, including adjustment screw 144 and spring 138, and the set pressure valve components, including spindle 150, seal member 159, and nozzle 154, are thus carried by the valve body 110 and are removed as a cartridge assembly with body 110.

The blowdown pressure for the pilot valve may be adjusted by rotating the sleeve 166 relative to the body extension 170. This rotation selectively raises or lowers the axial position of blowdown seat 168, thereby controlling the amount the piston 164 may axially move before sealingly engaging the blowdown seat 168. The spacing between the upper end of the rod 162 and the seal member 159 may thus be varied. The increase in this spacing results in a lower blowdown pressure and a decrease in the spacing results in a higher blowdown pressure. All the components of the blowdown pressure setting mechanism and the blowdown valve components, including sleeve 166, rod 162, blowdown seat 168, and piston 164 are also carried by the valve body and are removed as a cartridge assembly with the valve body. Blowdown adjustment is conventional for pilot valves controlling a safety relief valve, and upon blowdown the pilot valve returns to the closed position. Normally, the pilot valve is set with a blowdown pressure of about 5% to 7% less than the set pressure which causes the valve to open and depressurize the dome chamber. When the blowdown pressure is reached, the vessel pressure is again diverted by the pilot valve to the dome chamber, and the valve element in the safety relief valve housing returns to its closed position. The operation of the pilot valve as disclosed herein is functionally similar to the operation of the pilot valve disclosure in U.S. Pat. No. 4,865,074.

Figure 5:
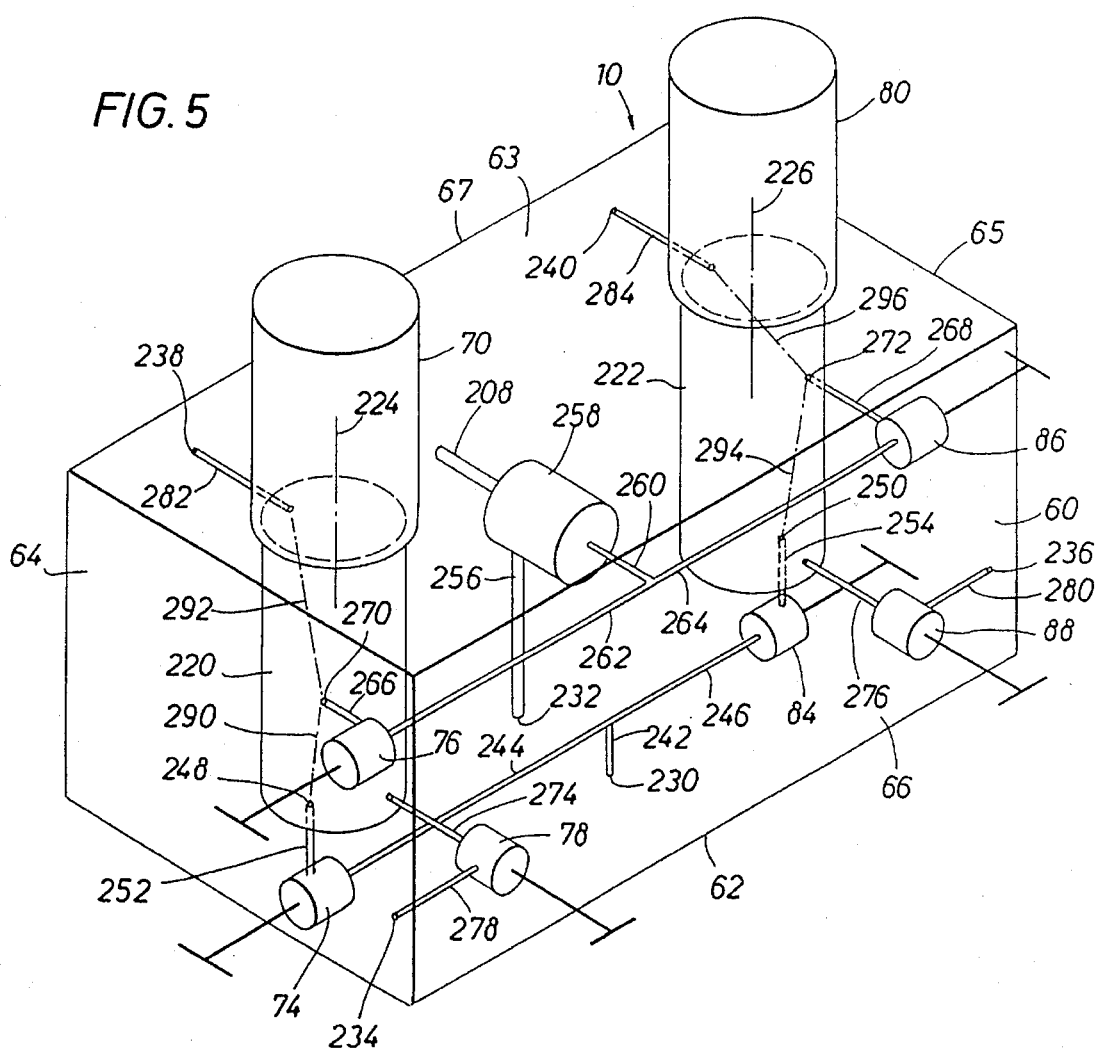
FIG. 5 is a simplified schematic view of the manifold assembly according to the present invention, illustrating particularly the positioning of the flow lines and the valves within the assembly.

FIG. 5 depicts schematically one embodiment of a manifold assembly 10 according to the present invention. Although shown schematically, the same reference numerals will be used to refer to components previously discussed and graphically shown in FIGS. 1–3. The unitary manifold block 60 has a rectilinear configuration, with top and bottom planar surfaces 63 and 62, side surfaces 64 and 65, and front and rear planar surfaces 66 and 67, respectively. The block 60 contains first and second generally cylindrical control cavities 220 and 222 each formed about a respectively vertical control cavity axis 224 and 226, respectively. Each control cavity is sized to receive the lower end of a respective pilot valve 70 and 80. In one embodiment, manifold assembly 10 is provided with a first pilot valve 70, and a auxiliary control member 80 is selected from a group consisting of a second pilot valve, a pressure transducer or other pressure gauge, a temperature transducer or other pressure gauge, and a solenoid valve. Each of these auxiliary control members 80 may thus be selectively mounted within the second control cavity 222.

The manifold block 60 includes a block inlet port 230 and a block dome pressure port 232 each within a lower planar block surface 62 for fluid communication with passageways 50 and 54, respectively, in the end plate 22 of the safety control valve 12. Since flow passageways are provided in the end plate 22 and the manifold block 60 is mounted directly on the plate 22, no tubing is required to connect the manifold block with either the inlet fluid port or the dome chamber in the safety relief valve 12. The manifold block also includes a first test port 234 in the first side 64 and a second test port 236 in the opposing second side 65. Each test port is in fluid communication with a respective test line 79 and 81 as shown in FIG. 2. The block 60 further contains vent ports 238 and 240 in the rear block face. Each of these vent ports is in fluid communication with a respective vent cap 72 as shown in FIG. 3.

Block 60 contains a common inlet passageway 242 extending from the port 230 to both first and second inlet passageways 244 and 246 each drilled from a respective side face of the block to intersect passageway 242. Short inlet paths 252 and 254 are each drilled downward through the lower end of the respective control cavity 220 and 222 for fluidly connecting the respective passageways 244 and 246 with the inlet port 248, 250 to the respective control cavity. First and second control valves 74 and 84 are each mounted on the manifold block for selectively closing off the first and second inlet passageways 244 and 246, respectively, to the first and second control cavities 220 and 222. No flow lines external of the block 60 and no permanent passageway plugs for drilled flow lines in the block need thus be provided to connect the block inlet port 230 with the first and second inlet ports 248 and 250 to the respective first and second control cavities 220 and 222.

A common dome pressure passageway 256 drilled upward from the lower block face 62 connects the block dome pressure port 232 with the unloader chamber 258, which houses the unloader valve 202 as shown in FIG. 1. A common horizontal passageway 260 drilled from the rear planar face 67 connects the chamber 258 with the first and second dome pressure passageways 262 and 264 each drilled from a side face 64 and 65 to intersect passageway 260. A portion of the dome chamber relief line 208 as shown in FIG. 1 is schematically depicted in FIG. 5. It should be understood that the unloader valve may be eliminated from the manifold assembly for applications other than flashing fluids, in which case the bushing 212 as shown in FIG. 1 may be replaced with a plug. Short flow lines 266 and 268 may each be drilled from the front face 66 to fluidly connect the respective dome pressure passageways 262 and 264 with a respective dome pressure port 270 and 272 to the control cavities 220 and 222. Each of the passageways 266 and 268 may be provided with a standard plug (not shown) in the front face 66 of the block 60. The plugs and the portion of each drilled passageway between the front face 66 and the passageways 266 and 268 are not depicted in FIG. 5 for clarity of the remaining components. Dome pressure control valves 76 and 86 mounted on the manifold block 60 extend through the respective block side 64 and 65 to control fluid pressure transmitted along the respective first and second dome pressure passageways 262 and 264. Each of the control valves 74 and 76 thus extend through a first side 64 of the manifold block, while the corresponding valves 84 and 86 similarly extend through the second side 65 of the manifold block. Each control valve includes a standard handle for moving a respective valve element into sealing engagement with a seat provided within the manifold block.

Test ports 234 and 236 are each connected to a respective control cavity 220 and 222 by a first and second test passageways 274 and 276 each drilled from a front face 66 to a respective control cavity. Connecting passageways 278 and 280 are each drilled through a side 64 and 65 to connect the ports 234 and 236 with the test passageways 274 and 276, respectively. Respective test valves 78 and 88 are each mounted on the manifold block and extend through the front face 66 for opening and closing the first and second test passageways 274 and 276, respectively. In an alternate embodiment of the invention, flow passageways 274 and 276 do not extend into the control cavities, and instead intersect flow lines 266 and 268 provided between each control cavity and the respective valves 76 and 86. This fluid connection requires drilling one more flow line (not shown) from the lower block face 62 upward to connect horizontal passageways 274 and 266, and another flow line (not shown) through the lower block face upward to connect horizontal passageways 276 and 268. While this alternate embodiment requires the drilling and then the plugging of two more passageways, the direct fluid connection of the passageway 266 with 274, and 268 with 276, ensures the reliable manual operation of the relief valve by opening the respective test valve 78 or 88 to vent fluid pressure in the line 260 and thus open the relief valve without requiring the fluid to flow through the control cavities, where fluid flow may be substantially restricted by the pilot valves.

Vent passageways 282 and 284 each connect the respective control cavities 220 and 222 with the vent ports 238 and 240. Each vent passageway vents the respective control cavity to the atmosphere during operation of the pilot valves, as explained above. These passageways 282 and 284 could extend through the pilot valve assembly 70 and 80 to vent above the upper block face 63, although preferably the passageways 282 and 284 are provided within the manifold block so that venting inherently occurs through the rear block face 67 of the manifold block, thereby venting in a direction away from the operator.

The manifold assembly as shown in FIG. 5 provides a compact design with a minimal number of access ports. By positioning the passageways and the control valves as disclosed herein, a substantially compact, minimal manufacturing cost design is obtained without drilling an excessive number of passageways, and without plugging numerous passageways. The design as shown in FIG. 5 in combination with the flow lines 50 and 54 in the end plate of the safety valve thus significantly reduces the chance of leakage in the safety relief system. Each of the block inlet port 230 and block dome pressure port 232 are desirably provided in the lower face of the manifold block for mounting the block directly on the end plate 22, while each of the first and second control cavities 220 and 222 has a vertical axis and opens through the upper face of the block, thereby permitting the vertical mounting of the pilot valves and/or auxiliary control members. The manually operated control valves 74, 76, 78, 84, 86, and 88 are each located for easy operator accessibility. The porting as shown in FIG. 5 also provides a self-draining feature, so that any liquids which accumulate within the block 60 will be automatically drained from the block, thereby preventing freezing of condensate within the block when the steam system is shut down. When the manifold assembly 10 is mounted on a safety valve as shown in FIG. 1, all flow passageways in the manifold block are either horizontal, inclined slightly downward for drainage to ports 230 or 232, or are substantially vertical for drainage to these ports. This self-draining feature also tends to remove solid contaminates from the flow passageways which otherwise might accumulate within the block.

The function of the pilot valves may be understood by reference to FIG. 5. When the first pilot valve is closed, the pilot valve essentially maintains open the flow path illustrated by dashed line 290 in FIG. 5, and simultaneously closes the flow path illustrated by dashed line 292. Accordingly, the first pilot valve normally operates to provide inlet fluid pressure from passageway 244 to passageway 262, and closes off the flow to vent passageway 282. When the first pilot valve opens, the flow path 290 is closed off and the flow path 292 is automatically opened, thereby interconnecting flow paths 262 and 282, and venting fluid from the manifold. When the first pilot valve is open, the closing off of flow path 290 prevents inlet fluid pressure from passing to the unloader valve or to the dome chamber 44 in the relief valve. The second test pilot valve similarly operates to control flow of fluid along the corresponding flow paths 294 and 296 within the second control cavity 222.

The control pilot valve assemblies 70 and 80 as shown in FIG. 4 are complete assemblies in the sense that all components of the valve set pressure mechanism and the valve blowdown pressure mechanism, including the pressure adjustment members, the valve elements, and the seats, are carried on and supported by the valve body. Accordingly, the complete assembly 70 may be installed within the control cavity 116 as shown on the left side of FIG. 4 which corresponds to the control cavity 220 schematically shown in FIG. 5. For high temperature applications, the seal 118 preferably is a metal O-ring, and may be pressed on the valve body 110. By providing a complete cartridge assembly for the pilot valves, and the time required to remove a worn pilot valve and install a refurbished pilot valve is minimized. Since all components of the assembly with the exception of the wedge ring seal 122 are supported on the valve body 110, the likelihood of improperly installing components is substantially eliminated.

To install the pilot valve assembly, only the wedge ring seal 122 need be inserted within the cavity 116 and lowered on the shoulder 312. The bushing 126 may then be lowered until threads 132 engage corresponding threads 314 on the manifold body 60. Further rotation of the bushing 126 will thereafter lower the valve body, compressing the seal 122 as described subsequently. The metal O-ring 118 is lowered but does not rotate during this assembly operation, thereby preventing galling or other damage to the O-ring or to the sidewalls of the cavity 116. Most importantly, the seal 122 which is highly compressed between the valve body and the manifold block does not rotate during this assembly operation, thereby minimizing damage to the seal, the valve body and the manifold block. The use of bushing 126 rotatable with respect to the body 110 is also important for facilitating removal and replacement of the pilot valve assembly. In high temperature applications, the metal O-ring 118 may tend to seize in position between valve body 110 and the manifold block 60. To remove the pilot valve assembly, the bushing 126 may be unthreaded, thereby pressing upward on the clip 128 and exerting a substantial upward force on the valve body 110 to break the connection between the valve body and the manifold block due to O-ring 118. During removal of the pilot valve assembly, the valve body 110 and the O-ring 118 are lifted vertically upward by rotation of the bushing 126, so that again damage to the O-ring 118 and to the interior walls of the control cavity 116 are minimized.

Figures 6A, 6B, 6C:
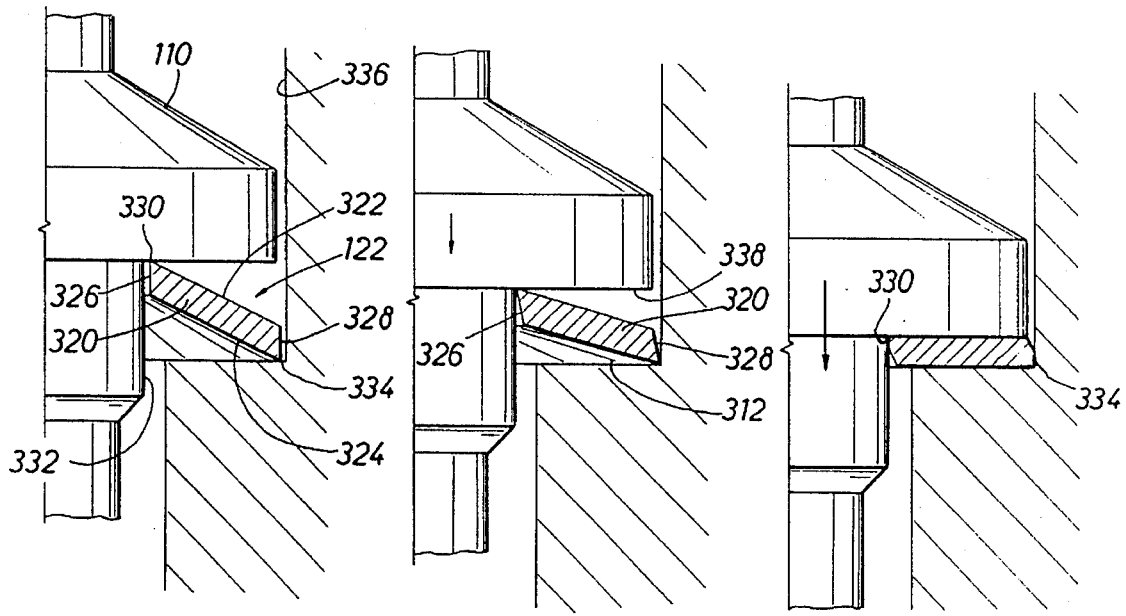
FIGS. 6A, 6B, and 6C sequentially depict the positioning of a portion of the valve body of the cartridge valve assembly within the manifold block, and particularly illustrate movement of the wedge ring seal for sealing engagement between the cartridge valve body and the manifold block.

As explained above, it is important that the wedge ring seal 122 provide a reliable high temperature, high pressure seal between the chambers 120 and 124 as shown in FIG. 4. As depicted in FIG. 6A, this wedge ring seal comprises a metal washer body 320 having a planar frustoconical upper surface 322 and a planar frustoconical lower surface 324 prior to being compressed into sealing engagement between the valve body 110 and the block 60. Prior to compression, the metal washer has a generally cylindrical interior surface 326 and a generally cylindrical exterior surface 328 each formed about at an axis coaxial with the central axis 160 of the valve assembly. These surfaces thus form an upper knife edge 330 for sealing engagement with an outer cylindrical surface 332 of the valve body 110, and a lower knife edge 324 for sealing engagement with an inner cylindrical surface 336 of the block. Prior to compression, the radial spacing between cylindrical surfaces 326 and 328 is purposefully less than the radial spacing between surfaces 332 and 336, so that the seal 122 may be easily dropped in place on the planar support ledge 312 of the manifold body.

During threaded rotation of the bushing 126 into the block 60, the planar shoulder surface 338 of the valve body 110 engages the upper knife edge 330, thereby exerting a downward "tipping" force on the body 320 for causing the upper knife edge 330 to engage the annular corner provided by the intersection of cylindrical surface 332 and planar shoulder surface 338, and for causing the lower knife edge 334 to engage the corner provided by the intersection of cylindrical surface 336 and planar support surface 312 (see FIG. 6B). The corners formed by these intersecting surfaces cooperate with the knife edges to ensure reliable sealing of the knife edge 330 with the cylindrical surface 332 adjoining the shoulder surface 338, and at the knife edge 334 with the cylindrical surface 336 adjoining the support surface 312, as explained further below. This design preferably results in each of the surfaces 326 and 328 being inclined with respect to the centerline 160 at an angle of from about 8° to about 15° when the knife edges first engage the respective intersecting surfaces, as shown in FIG. 6B. In order to form a reliable seal, the dimensions of the metal washer 320 are controlled such that, as the bushing 126 is further rotated to bring the surface 324 into planar engagement with the support surface 312 and to bring the surface 322 into planar engagement with the surface 338, the knife edge surfaces 330 and 334 are slightly deformed, as shown in FIG. 6C. A reliable seal is provided due to the concentration of a large force generated by the bushing rotation being distributed over a relatively small area as the knife edges 330 and 334 are forced into sealing engagement with the valve body and the manifold block.

A significant advantage of the seal design as shown in FIGS. 6A, 6B and 6C is that a reliable high pressure seal may be formed with relatively low torque exerted on the bushing 126. In a typical application, the bushing 126 may be torqued to a level only slightly greater than that provided by hand-tightening the bushing. This action will compress and deform the wedge ring seal 122 so as to provide reliable sealed engagement between the valve body and the manifold block to withstand gas pressures of several thousand psi. While the bushing 126 is unthreaded from the block, the wedge ring seal 122 returns to a configuration substantially as shown in FIG. 6A, and may thus be reused with a new valve cartridge. After repeated use, the seal 122 may be easily removed and replaced.

The cartridge valve assembly as disclosed herein has particular utility as a pilot valve assembly 80 suitable for controlling actuation of a pressure relief valve. The pilot valve assembly includes a valve element 159 and the seat 154 normally seal between the block cavity 120 and the block cavity 124, but unseal to established fluid communication between the flow lines 266 and 282 (see FIG. 5) when the set pressure of the pilot valve is reached. The seal 122 separating cavities 120 and 124 is forced into reliable static sealing engagement between the cartridge valve body 110 and a manifold 60 by axial threading of bushing 126 to the manifold block. The cartridge valve set pressure may be adjusted by increasing or decreasing the biasing force of spring 138 exerted on the valve element 159, as previously described.

The pilot valve assembly also includes a blowdown valve element 164 which normally is unsealed with blowdown seat 168. Fluid communication between cavities 114 and 120 normally occurs, thus providing fluid communication between the flow lines 252 and 266 in the manifold block (see FIG. 5). The blowdown valve element 164 and the seat 168 fluidly isolate cavities 114 and 120 when the cavities 120 and 124 are in fluid communication. The metal sealing ring 118 substantially seals between the cavities 114 and 120, as previously discussed.

The inlet control valves, the dome pressure control valves, and the test valves each include valve elements which close off respective passageways within the manifold block. While each of these control valve elements is preferably provided within the manifold block, the test valve element could be provided external of the block. When the pilot valve or the auxiliary control member is on-line, only one side of the normally closed test valve associated therewith is pressurized, while both the inlet and dome pressure valves associated therewith each have pressurized fluid on both sides of their respective valve elements. If the test valve elements were mounted external of the manifold block, additional expense would be incurred for the required fluid-tight fittings, and there is an increased risk of leakage between the valve block and the test valves. The pilot valves each are preferably at least partially mounted within the respective control cavities within the manifold block, thereby controlling pressure entirely within the manifold block between the respective control cavity inlet port and the control cavity dome pressure port. This configuration desirably reduces the number of seals required to seal between the manifold block and the pilot valves, and also reduces the number of fasteners required to support the pilot valve from the manifold block.

Those skilled in the art will appreciate that representative auxiliary control members have been disclosed herein, and that various types of auxiliary control members could be provided for either sensing a desired characteristic of the fluid within the control cavity or for controlling operation of the relief valve. The pressure gauges and fluid temperature sensing gauges discussed above are thus representative of sensors which measure a desired characteristic of the fluid within the control cavity. The additional pilot valve and the solenoid valve are representative of devices for controlling actuation of the relief valve.

While a safety relief valve according to the present invention with metallic valve elements, seats, and seals has been particularly described herein for an application wherein the vessel fluid is high temperature fluids, it should be understood that a cartridge valve assembly and a manifold assembly with the pilot valves having elastomeric or "soft" seats may alternatively be used in applications where the high temperature characteristics of metal seats and seals is not required. The manifold assembly may be subjected to various types of fluids, and an unloader is preferably included in the manifold block for flashing fluid applications.

The selector of mechanism 89 as disclosed above is suitable for mechanically preventing the closing of one of the pair of control valves and dome pressure control valves. However, other types of selector mechanisms could be used for mechanically or hydraulically preventing closure of these valves.

A particular advantage of the present invention is that the manifold assembly may be used in conjunction with an existing relief valve provided that the end cap 22 is replaced to provide the desired planar mounting surface for the manifold assembly. Accordingly, the manifold assembly as described herein may be used to control an existing relief valve without replacing or modifying the relief valve components other than the end cap. It is a particular feature of the invention that no tubing external of the manifold block is provided, with the exception of the dome chamber line 208 as shown in FIG. 1 and the test lines 79 and 81 as shown in FIG. 2. As explained earlier, both of these lines are not normally pressurized. Normally pressurized lines external of the relief valve body and the manifold block are thus avoided.

Those skilled in the art will appreciate that various modifications and adaptations to the preferred embodiments of the invention as discussed above may be made utilizing the novel concepts of this invention. Various changes in the manifold assembly and in the pilot valve assemblies may be made without departing from the scope of the invention as set forth in the following claims.

What is claimed is:

1. A manifold assembly for controlling actuation of a safety relief valve fluidly connected to a pressurized vessel, the safety relief valve including a safety relief valve housing having an upstream relief valve inlet port and a downstream relief valve outlet port, a relief valve member movable within the relief valve housing for controlling actuation of the safety relief valve, and a dome chamber within the relief valve housing normally maintained at substantially vessel pressure for acting on the relief valve member to maintain the safety relief valve closed, the manifold assembly comprising:

a manifold block having a block inlet port in fluid communication with the pressure vessel, a block dome pressure port in fluid communication with the dome chamber in the safety relief valve housing, and a first test port;

a first control cavity in the manifold block, the first control cavity including a first inlet port and a first dome pressure port;

a first inlet passageway in the manifold block fluidly connecting the block inlet port and the first inlet port;

a first inlet control valve mounted on the manifold block for selectively closing off the first inlet passageway within the manifold block;

a first dome pressure passageway in the manifold block fluidly connecting the block dome pressure port and the first dome pressure port;

a first dome pressure control valve mounted on the manifold block for selectively closing off the first dome pressure passageway within the manifold block;

a first test passageway in the manifold block for fluidly connecting the first test port and the first control cavity;

a first test control valve for selectively closing off the first test passageway;

a first vent passageway for venting fluid pressure from the first control cavity;

a first pilot valve responsive to pressure in the first inlet port, the first pilot valve being normally closed for maintaining fluid communication between the first inlet port and the first dome pressure port for supplying vessel pressure to the dome chamber in the relief valve housing and for prohibiting fluid communication between the first dome pressure port and the first vent passageway, and the first pilot valve opening to establish fluid communication between the first dome pressure port and the first vent passageway to relieve pressure from the dome chamber in the safety relief valve to open the safety relief valve when the vessel pressure reaches a selected value;

a second control cavity in the manifold block, the second control cavity including a second inlet port and a second dome pressure port;

a second inlet passageway in the manifold block fluidly connecting the block inlet port and the second inlet port;

a second inlet control valve mounted on the manifold block for selectively closing off the second inlet passageway within the manifold block;

a second dome pressure passageway in the manifold block fluidly connecting the block dome pressure port and the second dome pressure port;

a second dome pressure control valve mounted on the manifold block for selectively closing off the second dome pressure passageway within the manifold block;

a second vent passageway for venting fluid pressure from the second control cavity; and a selector mechanism for mechanically preventing closing of the first inlet control valve and the firing dome pressure control valve when in a first position, and for mechanically preventing closure of the second inlet control valve and the second dome pressure control valve when in a second position.

2. The manifold assembly as defined in claim 1, further comprising:

a second pilot valve responsive to pressure in the second inlet port, the second pilot valve being normally closed for maintaining fluid communication between the second inlet port and the second dome pressure port for supplying vessel pressure to the dome chamber in the relief valve housing and for prohibiting fluid communication between the second dome pressure port and the second vent passageway, and the second pilot valve opening to establish fluid communication between the second dome pressure port and the second vent passageway to relieve pressure from the dome chamber in the safety relief valve to open the safety relief valve when the vessel pressure reaches a selected value.

3. The manifold assembly as defined in claim 1, further comprising:

the manifold block has a lower face for mounting engagement with an end plate of the safety relief valve; and the first pilot valve extends through an upper face in the manifold block opposing the lower face.

4. The manifold assembly as defined in claim 1, further comprising:

a second test port in the manifold block;

a second test passageway in the manifold block for fluidly connecting the second test port and the second control cavity; and a second test control valve for selectively closing off the second test passageway.

5. The manifold assembly as defined in claim 4, wherein each of the first test control valve and the second test control valve is mounted on the manifold block for selectively closing off the first and the second test passageways, respectively, within the manifold block.

6. The manifold assembly as defined in claim 1, further comprising:

a dome chamber line for fluidly interconnecting the dome chamber in the relief valve and the downstream relief valve outlet port; and an unloader valve mounted at least substantially within the manifold block, and the unloader valve including an unloader valve member and an unloader dome chamber normally maintained at substantially vessel pressure, the unloader valve member being normally closed for prohibiting fluid communication between the dome chamber line and the dome chamber in the relief valve, and the unloader valve opening when the first pilot valve opens to release pressure in the dome chamber in the relief valve to the downstream relief valve outlet port.

7. The manifold assembly as defined in claim 1, further comprising:

an auxiliary control member mounted at least partially within the second control cavity.

8. The manifold assembly as defined in claim 7, wherein the auxiliary control member senses a characteristic of the fluid within the second control cavity.

9. The manifold assembly as defined in claim 1, wherein the first pilot valve includes a metal pilot valve member and a metal seat, the metal pilot valve member and metal seat cooperating for sealing pressure in the first control cavity.

10. The manifold assembly as defined in claim 1, wherein the first vent passageway is provided in the manifold block for venting fluid pressure from the first control cavity.

11. The manifold assembly as defined in claim 1, wherein the first pilot valve is mounted at least partially within the first control cavity for controlling fluid pressure within the manifold block between the first inlet port and the first dome pressure port.

12. A manifold assembly for controlling actuation of a relief valve, the relief valve including a relief valve housing having an upstream relief valve inlet port and a downstream relief valve outlet port, a relief valve member movable within the relief valve housing for controlling actuation of the relief valve, and a dome chamber within the relief valve housing normally maintained at a pressure sufficient to act on the relief valve member to maintain the relief valve closed, the manifold assembly comprising:

a manifold block having a generally rectilinear configuration including a block inlet port extending through a lower face of the manifold block for fluid communication with the relief valve inlet port, and a block dome pressure port extending through the lower face of the manifold block for fluid communication with the dome chamber in the relief valve housing;

a first control cavity in the manifold block, the first control cavity extending through an upper face of the manifold block opposing the lower face of the manifold block, the first control cavity including a first inlet port and a first dome pressure port;

a first inlet passageway in the manifold block fluidly connecting the block inlet port and the first inlet port;

a first inlet control valve mounted on the manifold block for selectively closing off the first inlet passageway within the manifold block;

a first dome pressure passageway in the manifold block fluidly connecting the block dome pressure port and the first dome pressure port;

a first dome pressure control valve mounted on the manifold block for selectively closing off the first dome pressure passageway within the manifold block;

a first vent passageway for venting fluid pressure from the first control cavity;

a first pilot valve being normally closed for maintaining fluid communication between the first inlet port and the first dome pressure port and prohibiting fluid communication between the first dome pressure port and the first vent passageway, and the first pilot valve opening to establish fluid communication between the first dome pressure port and the first vent passageway to open the safety relief valve;

a second control cavity in the manifold block, the second control cavity extending through the upper face of the manifold block opposing the lower face of the manifold block, the second control cavity including a second inlet port and a second dome pressure port;

a second inlet passageway in the manifold block fluidly connecting the block inlet port and the second inlet port;

a second inlet control valve mounted on the manifold block for selectively closing off the second inlet passageway within the manifold block;

a second dome pressure passageway in the manifold block fluidly connecting the block dome pressure port and the second dome pressure port;

a second dome pressure control valve mounted on the manifold block for selectively closing off the second dome pressure passageway within the manifold block;

a second vent passageway for venting fluid pressure from the second control cavity; and a selector mechanism for preventing closing of the first inlet control valve and the first dome pressure control valve when in a first position, and for mechanically preventing closure of the second inlet control valve and the second dome pressure control valve when in a second position.

13. The manifold assembly as defined in claim 12, further comprising:

a second pilot valve responsive to pressure in the second inlet port, the second pilot valve being normally closed for maintaining fluid communication between the second inlet port and the second dome pressure port for supplying vessel pressure to the dome chamber in the relief valve housing and for prohibiting fluid communication between the second dome pressure port and the second vent passageway, and the second pilot valve opening to establish fluid communication between the second dome pressure port and the second vent passageway to relieve pressure from the dome chamber in the safety relief valve to open the safety relief valve when the vessel pressure reaches a selected value.

14. The manifold assembly as defined in claim 12, further comprising:

a first test port in the manifold block;

a first test passageway in the manifold block for fluidly connecting the first test port and the first control cavity;

a first test control valve mounted on the manifold block for selectively closing off the first test passageway within the manifold block;

a second test port in the manifold block;

a second test passageway in the manifold block for fluidly connecting the second test port and the second control cavity; and a second test control valve mounted on the manifold block for selectively closing off the second test passageway within the manifold block.

15. The manifold assembly as defined in claim 14, wherein each of the first test control valve and the second test control valve extend through a front face of the manifold block.

16. The manifold assembly as defined in claim 12, wherein the first inlet control valve and the first dome pressure control valve extend through a first side of the manifold block between the lower face and the upper face, and the second inlet control valve and the second dome pressure control valve each extend through a second side of the manifold block between the lower face and the upper face and opposing the first side.

17. The manifold assembly as defined in claim 16, further comprising:

each of the first vent passageway and the second vent passageway is provided within the manifold block and extends through a rear face in the manifold block between the upper face and the lower face, and between the first side and the second side.

18. The manifold assembly as defined in claim 12, further comprising:

an auxiliary control member mounted at least partially within the second control cavity.

19. The manifold assembly as defined in claim 12, wherein the first pilot valve includes a metal pilot valve member and a metal seat, the metal pilot valve member and metal seat cooperating for sealing pressure in the first control cavity.

20. A manifold assembly for controlling actuation of a relief valve, the relief valve including a relief valve housing having an upstream relief valve inlet port and a downstream relief valve outlet port, a relief valve member movable within the relief valve housing for controlling actuation of the relief valve, and a dome chamber within the relief valve housing normally maintained at a pressure sufficient to act on the relief valve member to maintain the relief valve closed, the manifold assembly comprising:

a manifold block having a generally rectilinear configuration including a block inlet port extending through a lower face of the manifold block for fluid communication with the relief valve inlet port, and a block dome pressure port extending through a lower face of the manifold block for fluid communication with the dome chamber in the relief valve housing;

a first control cavity in the manifold block extending through an upper face of the manifold block opposing the lower face of the manifold block, the first control cavity including a first inlet port and a first dome pressure port;

a first inlet passageway in the manifold block fluidly connecting the block inlet port and the first inlet port;

a first inlet control valve mounted on the manifold block for selectively closing off the first inlet passageway within the manifold block;

a first dome pressure passageway in the manifold block fluidly connecting the block dome pressure port and the first dome pressure port;

a first dome pressure control valve mounted on the manifold block for selectively closing off the first dome pressure passageway within the manifold block;

a first test passageway in the manifold block for fluidly connecting the first test port and the first control cavity;

a first test control valve extending through a front face of the manifold block for selectively closing off the first test passageway;

a first vent passageway for venting fluid pressure from the first control cavity;

a first pilot valve being normally closed for maintaining fluid communication between the first inlet port and the first dome pressure port and prohibiting fluid communication between the first dome pressure port and the first vent passageway, and the first pilot valve opening to establish fluid communication between the first dome pressure port and the first vent passageway to open the safety relief valve;

a second control cavity in the manifold block extending through an upper face of the manifold block opposing the lower face of the manifold block, the second control cavity including a second inlet port and a second dome pressure port;

a second inlet passageway in the manifold block fluidly connecting the block inlet port and the second inlet port;

a second inlet control valve mounted on the manifold block for selectively closing off the second inlet passageway within the manifold block;

a second dome pressure passageway in the manifold block fluidly connecting the block dome pressure port and the second dome pressure port;

a second dome pressure control valve mounted on the manifold block for selectively closing off the second dome pressure passageway within the manifold block;

a second vent passageway for venting fluid pressure from the second control cavity; and a selector mechanism for preventing closing of the first inlet control valve and the first dome pressure control valve when in a first position, and for mechanically preventing closure of the second inlet control valve and the second dome pressure control valve when in a second position.

21. The manifold assembly as defined in claim 20, further comprising:

a second pilot valve being normally closed for maintaining fluid communication between the second inlet port and the second dome pressure port for supplying vessel pressure to the dome chamber in the relief valve housing and for prohibiting fluid communication between the second dome pressure port and the second vent passageway, and the second pilot valve opening to establish fluid communication between the second dome pressure port and the second vent passageway to relieve pressure from the dome chamber in the safety relief valve to open the safety relief valve when the vessel pressure reaches a selected value.

22. The manifold assembly as defined in claim 20, further comprising:

a second test port in the manifold block;

a second test passageway in the manifold block for fluidly connecting the second test port and the second control cavity; and a second test control valve mounted on the manifold block for selectively closing off the second test passageway within the manifold block.

23. The manifold assembly as defined in claim 22, wherein the second test control valve extends through a front face of the manifold block.

24. The manifold assembly as defined in claim 20, wherein the first inlet control valve and the first dome pressure control valve extend through a first side of the manifold block between the lower face and the upper face, and the second inlet control valve and the second dome pressure control valve each extend through a second side of the manifold block between the lower face and the upper face and opposing the first side.

25. The manifold assembly as defined in claim 24, further comprising:

each of the first vent passageway and the second vent passageway is provided within the manifold block and extends through a rear face in the manifold block between the upper face and the lower face, and between the first side and the second side.

26. The manifold assembly as defined in claim 20, further comprising:

an auxiliary control member mounted at least partially within the second control cavity.

27. The manifold assembly as defined in claim 20, wherein the first pilot valve includes a metal pilot valve member and a metal seat, the metal pilot valve member and metal seat cooperating for sealing pressure in the first control cavity.

* * * * *